C. W. MAGNAT, Jr.
CHILD'S SKID ROCKING HORSE.
APPLICATION FILED JAN. 12, 1920.
1,377,423.
Patented May 10, 1921.
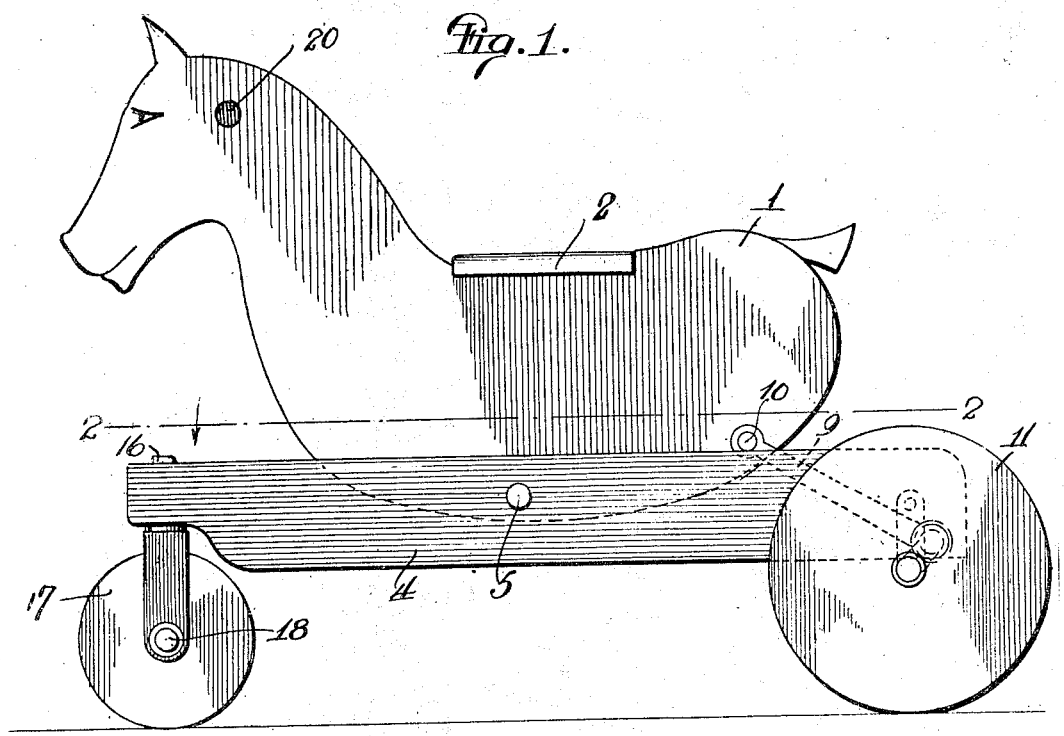
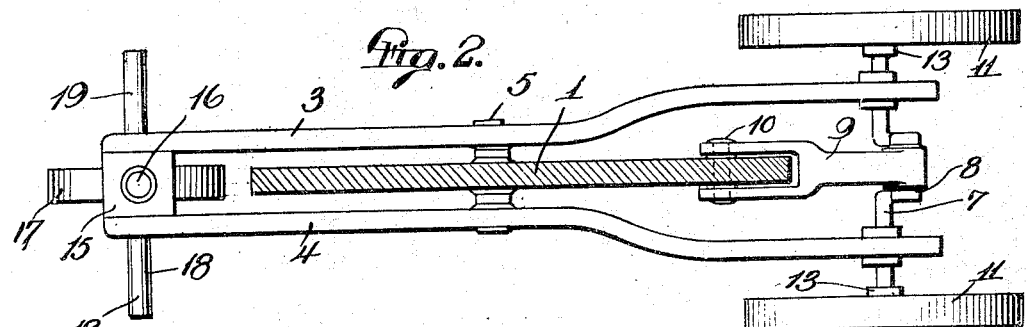
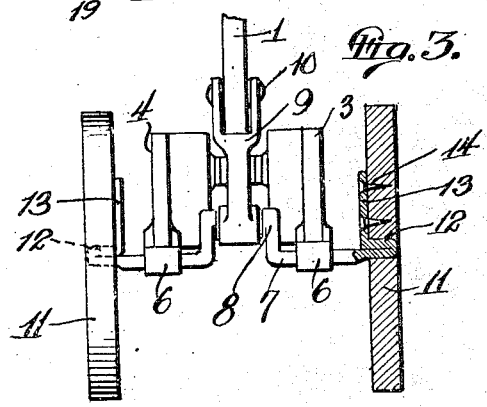
Inventor
Charles W. Magnat Jr.
By Frank Fuller, Attorney

UNITED STATES PATENT OFFICE.

CHARLES WARD MAGNAT, JR., OF PATERSON, NEW JERSEY.

CHILD'S SKID ROCKING-HORSE.

1,377,423.

Specification of Letters Patent.   Patented May 10, 1921.

Application filed January 12, 1920.   Serial No. 350,923.

*To all whom it may concern:*

Be it known that CHARLES W. MAGNAT, Jr., a citizen of the United States, residing at Paterson, in the county of Passaic and State of New Jersey, has invented certain new and useful Improvements in Children's Skid Rocking-Horses, of which the following is a specification.

This invention relates to toy horses and more particularly to a self propelled velocipede simulating a horse and adapted to be used for the recreation and exercise of children.

Another object of the invention is to provide a rocking horse which will, by virtue of the rocking movement, cause the device to be propelled.

The invention further aims to provide a novel method of attaching the wheels to the driving axle so that relative movement of the wheels and axle will be prevented.

The preferred embodiment of the invention is illustrated in the accompanying drawings in which:

Figure 1 is a side elevation.

Fig. 2 is a cross section on the line 2—2 of Fig. 1.

Fig. 3 is a rear end elevation, parts being shown in section.

Referring to the drawings, the body 1 of the device is in the form of the body of a horse and is constructed of a single board shaped as shown. A seat or saddle 2 is fixed in position on the portion of the body representing the back of the horse. Parallel frame bars 3 and 4 are spaced apart to permit the body 1 to be received between the bars and the body is provided with a pivot 5 which is journaled in the bars 3 and 4 whereby the body may be readily rocked. The rear ends of the frame bars 3 and 4 are spread outwardly and carry bearings 6 within which the crank shaft 7 is journaled. The crank portion 8 of the crank shaft is joined to a pitman 9 which is also connected to the body 1 by the pin 10. This end of the pitman is bifurcated so that the body may be received by the pitman to be properly connected thereto.

The manner of connecting the crank shaft to the rear wheels 11 is illustrated in Fig. 3. It will be noted that the ends of the crank shaft are each bent upon itself and these bent portions 12 form tenons extended into openings in the center of the wheels. From the bent portions the terminals of the axle are extended radially forming cleats 13 which are secured by screws 14 to the wheels. Thus relative movement of the wheels with respect to the axle will be prevented and the wheels will properly rotate when the axle is actuated.

The forward ends of the frame bars 3 and 4 are connected to and spaced apart by a block 15 which receives a king pin 16 having the front wheel 17 attached thereto through the medium of the front axle 18. The ends of this axle are extended to form foot rests 19 upon which the child may rest its feet for the purpose of steering the device. Handle bars 20 are attached to the head of the body which may be grasped by the child's hands to assist in imparting rocking movement to the body.

In operation, the child will assume its seat on the saddle 2, place its feet on the foot rest and grasp the handle bars 20 whereupon a rocking movement will be imparted to the body, the latter swinging on the pivot 5. The portion of the body to which the pitman is connected will thus be raised and lowered causing the pitman to reciprocate and transmit motion to the crank shaft thus turning the rear wheels.

What I claim is:—

1. A toy comprising a frame having a pivoted body mounted thereon, a crank shaft journaled on the frame, means to drive the crank shaft from the said body, the ends of the said crank shaft being provided with tenons, wheels mounted on the tenons, the extreme terminals of the crank shaft being extended radially and secured to the inner surfaces of the said wheels.

2. A toy comprising a frame, a pivoted body on the frame, a driving axle mounted on the frame, means connecting the driving axle with the pivoted body, the end portions of the said axle being folded upon themselves to provide axially extending tenons, wheels mounted on the tenons, the terminals of the said axles being extended radially from the tenons to provide cleats rigidly secured to the said wheels.

In testimony whereof I affix my signature.

CHARLES WARD MAGNAT, JR.